US 6,560,726 B1

(12) United States Patent
Vrhel, Jr. et al.

(10) Patent No.: US 6,560,726 B1
(45) Date of Patent: May 6, 2003

(54) METHOD AND SYSTEM FOR AUTOMATED TECHNICAL SUPPORT FOR COMPUTERS

(75) Inventors: Thomas Vrhel, Jr., Austin, TX (US); Gary D. Huber, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/377,726

(22) Filed: Aug. 19, 1999

(51) Int. Cl.[7] .............................................. G06F 9/00
(52) U.S. Cl. ............................................. 714/55; 713/2
(58) Field of Search ........................... 714/36, 55, 23, 714/2, 25, 31, 39, 48; 713/2, 1

(56) References Cited

U.S. PATENT DOCUMENTS

| 4,253,178 A | | 2/1981 | Kolaczia ..................... 368/285 |
|---|---|---|---|
| 4,356,545 A | | 10/1982 | West ........................... 364/200 |
| 4,438,458 A | | 3/1984 | Munscher .................... 358/254 |
| 4,491,914 A | * | 1/1985 | Sujaku ........................... 713/2 |
| 4,627,060 A | * | 12/1986 | Huang et al. .................. 714/36 |
| 4,635,187 A | * | 1/1987 | Baron et al. .................. 709/100 |
| 4,788,658 A | | 11/1988 | Hanebuth ..................... 364/900 |
| 4,809,280 A | * | 2/1989 | Shonaka ....................... 714/55 |
| 4,916,699 A | | 4/1990 | Ohashi ........................ 364/900 |
| 4,964,077 A | | 10/1990 | Eisen et al. .................. 364/900 |
| 5,010,551 A | | 4/1991 | Goldsmith et al. .......... 371/16.4 |
| 5,017,030 A | | 5/1991 | Crews ......................... 400/485 |

(List continued on next page.)

FOREIGN PATENT DOCUMENTS

| GB | 2065939 | 7/1981 | ........... G06F/11/30 |
|---|---|---|---|
| GB | 2329266 | 3/1999 | ........... G06F/11/00 |
| GB | 2356271 | 5/2001 | ........... G06F/11/00 |
| WO | WO 93/00628 | 1/1993 | ............ G06F/1/24 |
| WO | WO 94/08289 | 4/1994 | ........... G06F/9/445 |
| WO | WO 97/09676 | 3/1997 | |
| WO | WO 98/18086 | 4/1998 | |

OTHER PUBLICATIONS

Wilson et al. "Knowledge based interface to manufacturing computer system", ACM pp 1183–1189, 1988.
Green, "Component based software development: implications for documentation", ACM pp 159–164, 1999.
Hall et al., "A cooperative approach to support software deployment using software dock", ACM ICSE pp 174–183, 1999.
Great Britain Search and Examination Report 0019866.3, Mar. 12, 2001.

(List continued on next page.)

Primary Examiner—Robert Beausoliel
Assistant Examiner—Gabriel L. Chu
(74) Attorney, Agent, or Firm—Baker Botts L.L.P.

(57) ABSTRACT

A method and system for integrated support for solving problems with personal computer systems comprises monitoring operating system functionality to determine if a computer system failure exists, to identify the computer system failure and to provide a solution of the computer system failure. A robust user interface, including a simple-to-use user button interface, supports single touch user input to indicate a computer system problem or question. Watchdog timers compare the time of hardware and operating system functionality, such as boot sequence operation, against predetermined time periods to determine whether or not a computer failure exists. A computer system failure is determined if a watchdog timer expires upon completion of a predetermined time period without being cleared. A hardware problem is identified on initial boot if the watchdog timer is not cleared by an operating system service routine. An operating system hang-up is determined if a watchdog timer is not cleared by an application run in association with the operating system. If a computer failure is detected, a service mode is initiated with a service mode operating system to allow in-depth analysis and problem resolution. Service mode operation is also monitored to detect problems.

11 Claims, 3 Drawing Sheets

U.S. PATENT DOCUMENTS

| | | | |
|---|---|---|---|
| 5,060,135 A | 10/1991 | Levine et al. | 364/200 |
| 5,196,993 A | 3/1993 | Herron et al. | 361/393 |
| 5,214,695 A | 5/1993 | Arnold et al. | 380/4 |
| 5,224,024 A | 6/1993 | Tu et al. | 364/429 |
| 5,228,655 A | 7/1993 | Garcia et al. | 248/118 |
| 5,276,805 A | 1/1994 | Hamaguchi | 395/164 |
| 5,287,448 A | 2/1994 | Nicol et al. | 395/159 |
| 5,287,505 A | 2/1994 | Calvert et al. | 395/600 |
| 5,325,521 A * | 6/1994 | Koyama et al. | 713/502 |
| 5,346,410 A | 9/1994 | Moore, Jr. | 439/607 |
| 5,348,408 A | 9/1994 | Gelardi et al. | 400/715 |
| 5,353,240 A * | 10/1994 | Mallory et al. | 702/186 |
| 5,355,357 A | 10/1994 | Yamamori et al. | 369/75.2 |
| 5,356,099 A | 10/1994 | Sereboff | 248/118.1 |
| 5,367,667 A | 11/1994 | Wahlquist et al. | 395/575 |
| 5,374,018 A | 12/1994 | Daneshvar | 248/118 |
| 5,375,800 A | 12/1994 | Wilcox et al. | 248/118 |
| 5,381,526 A | 1/1995 | Ellson | 395/164 |
| 5,388,032 A | 2/1995 | Gill et al. | 364/146 |
| 5,390,324 A * | 2/1995 | Burckhartt et al. | 714/23 |
| 5,392,095 A | 2/1995 | Siegel | 355/200 |
| 5,398,333 A * | 3/1995 | Schieve et al. | 713/1 |
| 5,410,447 A | 4/1995 | Miyagawa et al. | 361/681 |
| 5,422,751 A | 6/1995 | Lewis et al. | 359/83 |
| 5,423,605 A | 6/1995 | Liu | 312/265.6 |
| 5,432,927 A * | 7/1995 | Grote et al. | 711/103 |
| 5,443,237 A | 8/1995 | Stadtmauer | 248/441.1 |
| 5,450,576 A * | 9/1995 | Kennedy | 709/222 |
| 5,454,080 A | 9/1995 | Fasig et al. | 395/283 |
| 5,455,933 A | 10/1995 | Schieve et al. | 395/183.03 |
| 5,471,674 A * | 11/1995 | Stewart et al. | 710/13 |
| 5,483,437 A | 1/1996 | Tang | 363/146 |
| 5,503,484 A | 4/1996 | Louis | 400/489 |
| 5,513,319 A * | 4/1996 | Finch et al. | 714/55 |
| 5,522,572 A | 6/1996 | Copeland et al. | 248/118 |
| 5,526,180 A | 6/1996 | Rausnitz | 359/609 |
| 5,530,847 A | 6/1996 | Schieve et al. | 395/183.14 |
| 5,537,585 A | 7/1996 | Blickenstaff et al. | 395/600 |
| 5,537,618 A | 7/1996 | Boulton et al. | 395/161 |
| 5,547,154 A | 8/1996 | Kirchoff et al. | 248/118.3 |
| 5,547,272 A | 8/1996 | Paterson et al. | 312/223.2 |
| 5,564,054 A * | 10/1996 | Bramnick et al. | 713/2 |
| 5,592,362 A | 1/1997 | Ohgami et al. | 361/686 |
| 5,596,481 A | 1/1997 | Liu et al. | 361/683 |
| 5,596,482 A | 1/1997 | Horikoshi | 361/683 |
| 5,627,964 A * | 5/1997 | Reynolds et al. | 714/46 |
| 5,649,200 A | 7/1997 | Leblang | 717/122 |
| 5,668,992 A | 9/1997 | Hammer et al. | 395/651 |
| 5,678,002 A | 10/1997 | Fawcett et al. | 395/183.01 |
| 5,680,640 A | 10/1997 | Ofek et al. | 395/839 |
| 5,689,253 A | 11/1997 | Hargreaves et al. | 341/22 |
| 5,689,706 A | 11/1997 | Rao et al. | 395/617 |
| 5,694,293 A | 12/1997 | Seto et al. | 361/687 |
| 5,708,776 A * | 1/1998 | Kikinis | 714/10 |
| 5,708,812 A | 1/1998 | Van Dyke et al. | 395/712 |
| 5,724,224 A | 3/1998 | Howell et al. | 361/680 |
| 5,727,163 A | 3/1998 | Bezos | 395/227 |
| 5,732,268 A | 3/1998 | Bizzarri | 395/652 |
| 5,748,877 A | 5/1998 | Dollahite et al. | 395/183.12 |
| 5,759,644 A | 6/1998 | Stanley | 428/14 |
| 5,768,370 A | 6/1998 | Maatta et al. | 379/433 |
| 5,775,822 A | 7/1998 | Cheng | 400/489 |
| 5,778,372 A | 7/1998 | Cordell et al. | 707/100 |
| 5,790,796 A | 8/1998 | Sadowsky | 395/200.51 |
| 5,796,579 A | 8/1998 | Nakajima et al. | 361/683 |
| 5,797,281 A | 8/1998 | Fox | 63/12 |
| 5,803,416 A | 9/1998 | Hanson et al. | 248/118 |
| 5,805,882 A | 9/1998 | Cooper et al. | 395/652 |
| 5,809,248 A | 9/1998 | Vidovic | 395/200.49 |
| 5,809,511 A | 9/1998 | Peake | 707/204 |
| 5,818,635 A | 10/1998 | Hohn et al. | 359/612 |
| 5,819,274 A | 10/1998 | Jackson, Jr. | 707/10 |
| 5,825,355 A | 10/1998 | Palmer et al. | 345/336 |
| 5,825,506 A | 10/1998 | Bednar et al. | 358/402 |
| 5,826,839 A | 10/1998 | Chen | 248/118 |
| 5,832,522 A | 11/1998 | Blickenstaff et al. | 707/204 |
| 5,835,344 A | 11/1998 | Alexander | 361/683 |
| 5,845,136 A | 12/1998 | Babcock | 395/750.01 |
| 5,852,545 A | 12/1998 | Pan-Ratzlaff | 361/683 |
| 5,854,828 A | 12/1998 | Kocis et al. | 379/93.31 |
| 5,860,001 A | 1/1999 | Cromer et al. | 395/651 |
| 5,860,002 A * | 1/1999 | Huang | 709/222 |
| 5,860,012 A | 1/1999 | Luu | 395/712 |
| 5,861,884 A | 1/1999 | Fujioka | 345/338 |
| 5,881,236 A | 3/1999 | Dickey | 395/200.51 |
| 5,884,073 A | 3/1999 | Dent | 395/652 |
| 5,894,571 A | 4/1999 | O'Connor | 395/652 |
| 5,904,327 A | 5/1999 | Cheng | 248/118.1 |
| 5,905,632 A | 5/1999 | Seto et al. | 361/683 |
| 5,906,506 A | 5/1999 | Chang et al. | 439/500 |
| 5,909,544 A | 6/1999 | Anderson, II et al. | 395/200.38 |
| 5,939,694 A | 8/1999 | Holcomb et al. | 235/381 |
| 5,953,533 A | 9/1999 | Fink et al. | 395/712 |
| 5,955,797 A | 9/1999 | Kim | 307/150 |
| 5,960,189 A | 9/1999 | Stupek, Jr. et al. | 395/500.43 |
| 5,960,204 A | 9/1999 | Yinger et al. | 395/712 |
| 5,960,411 A | 9/1999 | Hartman et al. | 705/26 |
| 5,963,743 A | 10/1999 | Amberg et al. | 395/712 |
| 5,974,546 A * | 10/1999 | Anderson | 713/2 |
| 5,978,911 A * | 11/1999 | Knox et al. | 713/1 |
| 5,983,369 A | 11/1999 | Bakoglu et al. | 714/46 |
| 5,991,543 A | 11/1999 | Amberg et al. | 395/712 |
| 5,995,757 A | 11/1999 | Amberg et al. | 395/712 |
| 6,006,344 A | 12/1999 | Bell, Jr. | 714/37 |
| 6,012,154 A * | 1/2000 | Poisner | 714/51 |
| 6,014,744 A * | 1/2000 | McKaughan et al. | 713/100 |
| 6,023,267 A | 2/2000 | Chapuis et al. | 345/327 |
| 6,029,257 A | 2/2000 | Palmer | 714/40 |
| 6,029,258 A | 2/2000 | Ahmad | 714/46 |
| 6,032,157 A | 2/2000 | Tamano et al. | 707/104 |
| 6,034,869 A | 3/2000 | Lin | 361/686 |
| 6,038,597 A | 3/2000 | Van Wyngarden | 709/219 |
| 6,047,261 A | 4/2000 | Siefert | 705/11 |
| 6,048,454 A | 4/2000 | Howell et al. | 361/686 |
| 6,049,342 A | 4/2000 | Nielsen et al. | 345/473 |
| 6,050,833 A | 4/2000 | Danzyger et al. | 439/92 |
| 6,056,136 A | 5/2000 | Taber et al. | 215/252 |
| 6,061,788 A * | 5/2000 | Reynaud et al. | 713/100 |
| 6,061,810 A * | 5/2000 | Potter | 714/23 |
| 6,065,136 A | 5/2000 | Kuwabara | 714/31 |
| 6,104,874 A | 8/2000 | Branson et al. | 395/702 |
| 6,108,697 A | 8/2000 | Raymond et al. | 709/218 |
| 6,112,320 A * | 8/2000 | Dien | 714/51 |
| 6,113,050 A | 9/2000 | Rush | 248/346.01 |
| 6,166,729 A | 12/2000 | Acosta et al. | 345/327 |
| 6,167,383 A | 12/2000 | Henson | 705/26 |
| 6,167,532 A * | 12/2000 | Wisecup | 714/23 |
| 6,170,065 B1 | 1/2001 | Kobata et al. | 714/7 |
| 6,182,212 B1 | 1/2001 | Atkins et al. | 713/1 |
| 6,182,275 B1 | 1/2001 | Beelitz et al. | 717/1 |
| 6,199,204 B1 | 3/2001 | Donohue | 717/11 |
| 6,202,207 B1 | 3/2001 | Donohue | 717/11 |
| 6,226,412 B1 | 5/2001 | Schwab | 382/232 |
| 6,236,901 B1 | 5/2001 | Goss | 700/95 |
| 6,247,126 B1 | 6/2001 | Beelitz et al. | 713/1 |
| 6,256,620 B1 | 7/2001 | Jawahar et al. | 707/2 |
| 6,263,215 B1 | 7/2001 | Patton et al. | 455/561 |
| 6,272,484 B1 | 8/2001 | Martin et al. | 707/1 |
| 6,279,109 B1 | 8/2001 | Brundridge | 713/2 |
| 6,279,125 B1 | 8/2001 | Klein | 714/38 |
| 6,279,156 B1 | 8/2001 | Amberg et al. | 717/11 |

| | | |
|---|---|---|
| 6,298,443 B1 | 10/2001 | Colligan et al. .............. 713/200 |
| 6,298,457 B1 | 10/2001 | Rachlin et al. ................ 714/49 |
| 6,331,936 B1 | 12/2001 | Hom et al. .................. 361/686 |
| 6,356,977 B2 | 3/2002 | Ofek et al. .................. 711/112 |
| 6,367,035 B1 | 4/2002 | White .......................... 714/40 |
| 6,385,737 B1 | 5/2002 | Benignus et al. .............. 714/22 |
| 6,393,586 B1 * | 5/2002 | Sloan et al. .................... 713/1 |
| 6,449,735 B1 * | 9/2002 | Edwards et al. .............. 714/25 |
| 6,487,464 B1 * | 11/2002 | Martinez et al. .............. 700/79 |
| 6,505,298 B1 * | 1/2003 | Cerbini et al. ................. 713/1 |

OTHER PUBLICATIONS

Pending Patent Application Ser. No. 09/236,862: Alan E. Beelitz, Richard D. Amberg; "Recoverable Software Installation Process and Apparatus for a Computer System"; Dell USA, L.P., filed Jan. 25, 1999.

"HP builds in Net button," at Internet <http://news.cnet.com/news/0–1003–202–316545.html>, printed Oct. 18, 1999.

Exploring Windows NT "ZD Journals" at Internet >http://www.zdjournals.com/9802.ewn9821.html<, printed Oct. 18, 1999.

"Packard Bell PCs provide state–of–the–art technology and complete user support" at <http://www.gadgetguru.com.html>, printed Oct. 18, 1999.

PCWorld News "Compaq Debuts Home PCs" at Internet >http://www2.pcworld.com.html<, printed Oct. 18, 1999.

Compaq Computer Corporation, Press Release, "New PCs Offer Equipment, Colour and Personality; Compaq's Presario Range Opened Up for Customisation" at Internet >http://biz.yahoo.com/prnews/000719/compaq_new.html<, printed Jul. 24, 2000.

Compaq Computer Corporation, "Home and Home Office Computing, My Style" at internet >wysiwyg://3/http://athome.compaq.com/showroom/static/splash.asp<, printed Jul. 18, 2000.

Epson, "Epson Stylus Color 74i It makes a Colorful Case for Being Your iMac Printer" at Internet >http://www.epson.com/printer/inkjet/sty740i.html<, printed Jul. 24, 2000.

Radio Shack, advertisement, p. 2, Aug. 20, 2000.

CNET.com, "IBM to Get Colorful with New Notebooks" at Internet >http://news.cnet.com/news/0–1003–200–296049.html?tag=st.con.1fd2<, printed Oct. 6, 1999.

3Com, "Palm Computer, News and Promotions" at Internet >http://www.palm.com/pr/holidaydebut.html<, printed Oct. 5, 1999.

@Backup Company, "@Backup Company Information Page" at Internet, http://security.atbackup.com/VID101.3.819255.0/Company.htm, Printed Jun. 15, 1999.

@Backup Company, "@Backup Company Frequently Asked Questions" at Internet, http://security.atbackup.com/VID101.3.819255.0/FAQ.asp, Printed Jun. 15, 1999.

@Backup Company, "Frequently Asked Questions: Technical" at Internet, http://security.atbackup.com/VID101.3.819255.0/Tech.asp, Printed Jun. 15, 1999.

@Backup Company, "Are You Protected" at Internet, http://security.atbackup.com/VID101.3.819255.0/Main.asp, Printed Jun. 15, 1999.

Pending Patent Application: Jeffrey N. Sloan, Tim Sullivan, David S. Springer, "*Method and Apparatus for Diagnosing and Conveying an Identification Code in Post on a Non–Booting Personal Computer*"; Dell USA, L.P.

* cited by examiner

METHOD AND SYSTEM FOR AUTOMATED TECHNICAL SUPPORT FOR COMPUTERS

TECHNICAL FIELD

This patent application relates in general to the field of computing devices, and more particularly to a method and system for automating support for computers.

BACKGROUND

Personal computer systems have become increasingly common in businesses and households. Although the term "personal computer" implies a generic device, personal computers generally have a wide diversity of hardware and software components. For instance, different personal computers may have processors and buses of different speeds, hard drive and RAM memories of different sizes, and peripheral devices interfaced with different types of interface cards, such as audio devices. Further, a large array of manufacturers produce computer components so that in a given personal computer even components having substantially similar operating characteristics may have important differences based on each component's manufacturer specification.

With respect to software, generally all personal computers have a common need for an operating system that coordinates the operation of hardware components. However, each individual personal computer may have one of many possible operating systems. For instance, Microsoft products have evolved from its original Disk Operating System ("DOS") to Windows systems, including Windows 3.1, Windows 95, Windows 98, Windows CE and Windows NT. In addition to these Microsoft operating systems other types of operating systems are available, such as different versions of Unix, including Linux.

In addition to this wide diversity of operating systems, personal computers may operate a large number of different types of software applications. A given software application may interact in different manners with different operating systems. Thus, even with substantially similar hardware components, personal computers having different software may operate in substantially different manners.

Computer users can experience difficulties in system operation for many reasons. Lack of knowledge, hardware faults, software incompatibilities, and many other causes can lead to problems for the computer user. Given the wide range of hardware and software available (which implies an even greater range of hardware/software combinations that a user can experience), it is difficult to determine if the computer has a problem.

This situation is further complicated by the fact that personal computers do not have good mechanisms to automatically determine if the hardware/software system is having a problem. While certain operating systems contain code that help sense some types of problems with specific pieces of hardware, such mechanisms may be insufficiently uniform for determining if the operating system has a problem. Indeed, a common symptom of an operating system problem is a failure to boot, in which case the OS cannot be counted on to help. Another common symptom of an operating system problem is a hang, in which case the operating system becomes unresponsive to the keyboard and mouse for a wide variety of possible causes. It should be noted that this type of problem can be caused by pieces of software which have been installed on top of the operating system, such as an application or driver, or some incompatibility between pieces of software that have been loaded. A system that was operational may stop functioning at some later point due to software incompatibilities.

Another issue is the lack of a uniform mechanism for the user to invoke assistance. If the user has a question or the system has a problem, or at least the user perceives a problem, there is currently no uniform mechanism to get the system to attempt to provide assistance to the user. Although there are various types of help available to the user, they rely on one or more working input devices, such as a mouse and/or a keyboard, and a sufficient level of user knowledge to be able to navigate to one of a variety of information sources on the system and on a global information source such as the internet.

SUMMARY

Therefore, a need has arisen for a method and system for identifying and resolving personal computer system problems which is accessible through a uniform mechanism regardless of the functional state of the operating system and other software.

A further need exists for a method and system which detects when an operating system has failed to boot and can take appropriate corrective actions.

A further need exists for a method and system which can detect when an operating system hangs and can then take appropriate actions.

A further need exists for a standard mechanism which can be invoked to attempt to resolve operating system failure to boot and operating system hang conditions.

In accordance with the present disclosure, a method and system is provided that substantially eliminates or reduces disadvantages and problems associated with previously developed methods and systems for resolving computer system problems. A monitoring system detects problems with a computer system and aides in identifying and resolving the problems. The current level of functionality of the computer system is determined, and technical support is provided for the computer system in accordance with the functionality of the computer system.

More specifically, a state machine monitors operating system functionality to detect computer system failures. A watchdog timer is initiated substantially simultaneous with computer system boot and cleared at a predetermined point of the computer system boot sequence. A computer system failure is determined to exist if the watchdog timer remains uncleared after a predetermined time period. For instance, the watchdog timer is cleared with an operating system service routine before expiration of the predetermined time period, thus indicating that the operating system has booted through the service routine point of the boot sequence within the predetermined time period. Failure to clear the watchdog timer with the service routine indicates failure of the boot process through the boot sequence point at which the service routine is called.

In one embodiment, a user initiates operating system monitoring by pressing a service button to indicate a problem with the computer system. The pressing of the service button initiates support functions, such as the initiation of a service application; this allows testing of the computer system by the monitoring system. Alternatively or in addition to the initiating of the watchdog timer associated with monitoring the boot through calling of the operating system, the service button initiates another watchdog timer that acts as a hang detection timer. If the service button is pressed during computer system boot, the hang detection timer is initiated at a predetermined point of the computer system boot sequence, such as after a user provides log in information, and is cleared upon initiation of the service application. An operating system hang-up error is identified if the hang detection timer remains uncleared after a predetermined hang detection time.

In one embodiment, detection of a computer failure results in a reboot of the computer system to a service mode. The service mode boots up a service mode operating system to enable analysis of the computer system even if the computer system's primary operating system has failed. Initiation of a service mode boot also starts a watchdog timer. The watchdog timer is cleared at a predetermined point of the service mode operating system boot sequence. A computer system failure is determined to exist if the watchdog timer remains uncleared after a predetermined time period. If the service mode boot was initiated by a previous user press of the service button and ensuing fault detection, then a service mode hang detection timer monitors the service mode operating system boot sequence to detect any hang-up of the service mode operating system.

The present invention provides many important technical advantages. One important technical advantage is integrated support for detecting problems associated with computer systems. Monitoring a computer system boot sequence for hardware or operating system failure enables automation of problem detection and support for resolving the problems. Further, detection of an operating system failure allows analysis and correction of the computer system problem through use of the service mode operating system.

Another important technical advantage is the automatic confirmation that a problem exists with a computer system. Indication that the monitoring system has detected a problem provides, as a minimum, confirmation to technical support staff with reduced dependence on the verbal description of the computer system user. Problem confirmation limits the number of basic items that technical support staff need to check over the course of a telephone call. Further, if the monitoring system does not detect a problem, then technical support staff can limit the number of problems needing investigation. For instance, failure to detect a problem with the monitoring system indicates that the hardware and operating system have booted in a normal manner, and the system is capable of initiating the service application.

Another important technical advantage is the identification of the problem associated with the computer system. For instance, monitoring of the computer system boot allows identification of problems as associated with hardware or with the operating system, or alternatively may indicate proper hardware and operating system functionality that indicates user or application related difficulties. If operating system software is the problem, use of a service mode operating system supports full analysis to further identify and analyze the problem. For instance, if the main operating system is inoperable, then the service mode operating system supports computer system operation and allows operation of the computer system for automatic analysis and correction of the problem with the main operating system.

Another important technical advantage is a robust user interface that is simple and uncomplicated to use. For instance, a user with a question or problem simply pushes a single service button. Pressing the service button generates an interrupt directly into the chip set to, for instance, initiate a service application with hang detection monitoring. The direct interface of the service button to the chip set enhances reliability and simplicity. For instance, the user's input to the service button does not have to rely on the operation of computer components, such as a keyboard or mouse. Further, once the service button is pressed, the computer system may perform an indepth analysis of potential problems, even when the operating system has failed, by using the service mode operating system to run computer components.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION

Preferred embodiments of the present invention are illustrated in the FIGURES, like numeral being used to refer to like and corresponding parts of the various drawings.

A healthy operating system monitors hardware and software operations on a computer system. At times, the operating system detects difficulties or problems with the computer system and provides notice of the difficulties or problems to the computer system user. Help systems generally associated with the operating system can help to resolve difficulties or problems either automatically or through user interaction, such as asking questions. However, when the operating system itself has a problem or there are software incompatibilities, it is difficult for the operating system to address those problems. Frequently, the operating system either shuts down or hangs up without providing further notice of the problem to the computer system user.

To improve computer system problem detection, identification and resolution, a monitoring system associated with the computer system's BIOS monitors operating system functionality. The monitoring system detects operating system boot failures and various types of operating system hang-ups. Once a problem is detected, remedial action is automatically taken to recover a failed computer system using a uniform mechanism that takes advantage of operational aspects of the computer system. For instance, a single push of a service button provides an interrupt to the computer system chip set for automatically invoking the highest available level of user assistance as determined by computer system health and state. The service button may be pressed by a user while the computer system is in POST, booting, in service mode or in normal mode. When the service button is pressed, the BIOS sets a bit in a CMOS register and generates an interrupt. State-sensitive interrupt handler code in BIOS takes appropriate action based upon the state of computer system as represented by certain CMOS bits.

Figure 1:
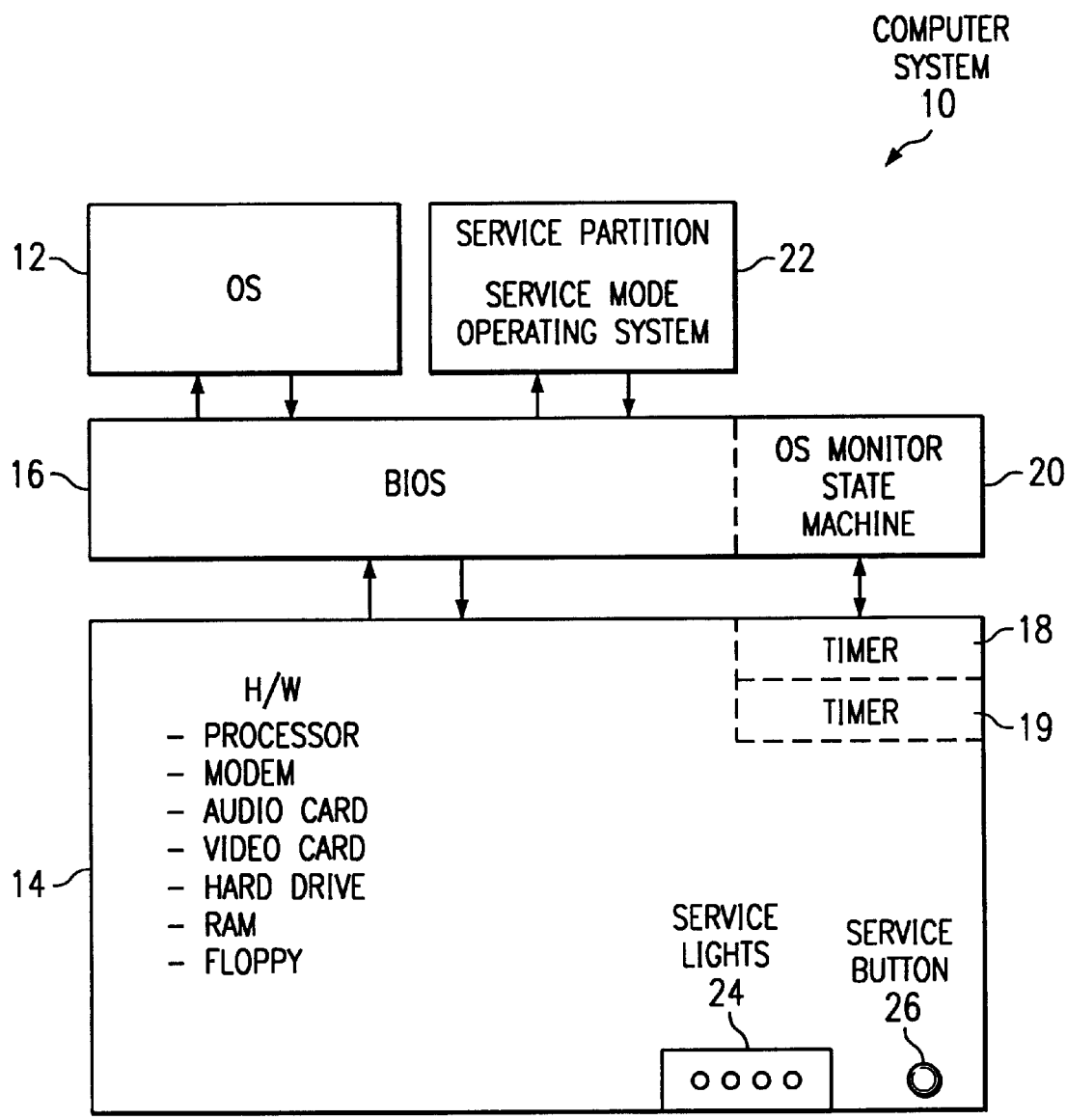
FIG. 1 depicts a block diagram of a computer system monitored by an operating system monitor state machine.

Referring now to FIG. 1, a block diagram depicts a computer system 10 having an operating system 12 interfaced with hardware components 14 through a basic input output system ("BIOS") 16. Hardware components 14 include conventional personal computer system hardware components such as a processor, modem, audio card, video card, and storage devices, including a hard drive, floppy drives, ROM and RAM. On initial power-up or upon initiation of a re-boot, BIOS 16 directs a boot sequence, including a power on self test ("POST") and calling of the operating system. Within hardware 14 resides one or more timers 18 and 19, such as a conventional watchdog timers.

BIOS 16 boots computer system 10 on power up in a conventional manner. A monitor state machine 20 monitors the boot process by comparing state transitions through the boot sequence against expected results. Monitor state machine 20, for instance, communicates with timer 18 to compare the expected time for a predetermined transition from a first point of the boot sequence to a second point against elapsed time for the sequence. If timer 18 expires uncleared, then a problem has been detected based upon the timer's expiration. If BIOS 16 successfully boots computer system 10 to bring operating system 12 on line, then a service routine of operating system 12 clears timer 18 to prevent an indication of a problem.

If monitor state machine 20 detects a problem with computer system 10, BIOS 16 may direct a number of different responses. For instance, BIOS 16 may call up a service mode operating system with service protocol 22. The service mode operating system may, for instance, be a simplified version of operating system 12, such as the Windows' Safe mode for Windows 98. The service mode operating system may include a modem driver so that the computer system can contact an analysis server through the Internet to upload user symptoms, system configuration and state information, as well as to run automated analysis software and diagnosis. BIOS 16 also may illuminate service lights 24 to indicate detection of a problem, with a different configuration of lights indicating the identity of one or more specific problems. A computer user may then provide the illuminated light information to technical support to help analyze and solve the problem. Alternatively, technical support may obtain system information from the analysis server.

Computer system 10 includes a service button 26 available for a computer user to press. Service button 26 provides a robust user interface that enables a user to initiate the problem detection and identification process. Service button 26 generates an interrupt into the computer system chip set to, for instance, initiate a service application. Monitor state machine 20 detects pressing of the service button and launches the service application or monitors the system behavior to detect computer system problems.

In addition to monitoring the boot sequence through the calling of operating system 12, monitor state machine 20 may monitor the functioning of operating system 12 with a hang detection timer 19. If the service button has been pressed during boot, hang detection timer 19 is initiated during the boot sequence, for instance, by a user login, and cleared by an application run after completion of the calling up and booting of operating system 12 or service mode operating system 22. If the application does not clear hang detection timer 19 within a predetermined period of time, monitoring state machine 20 determines that an operating system hang-up has occurred. BIOS 16 then recognizes an operating system problem and attempts a service mode boot or indicates a probable hardware failure through service lights 24.

Figure 2:
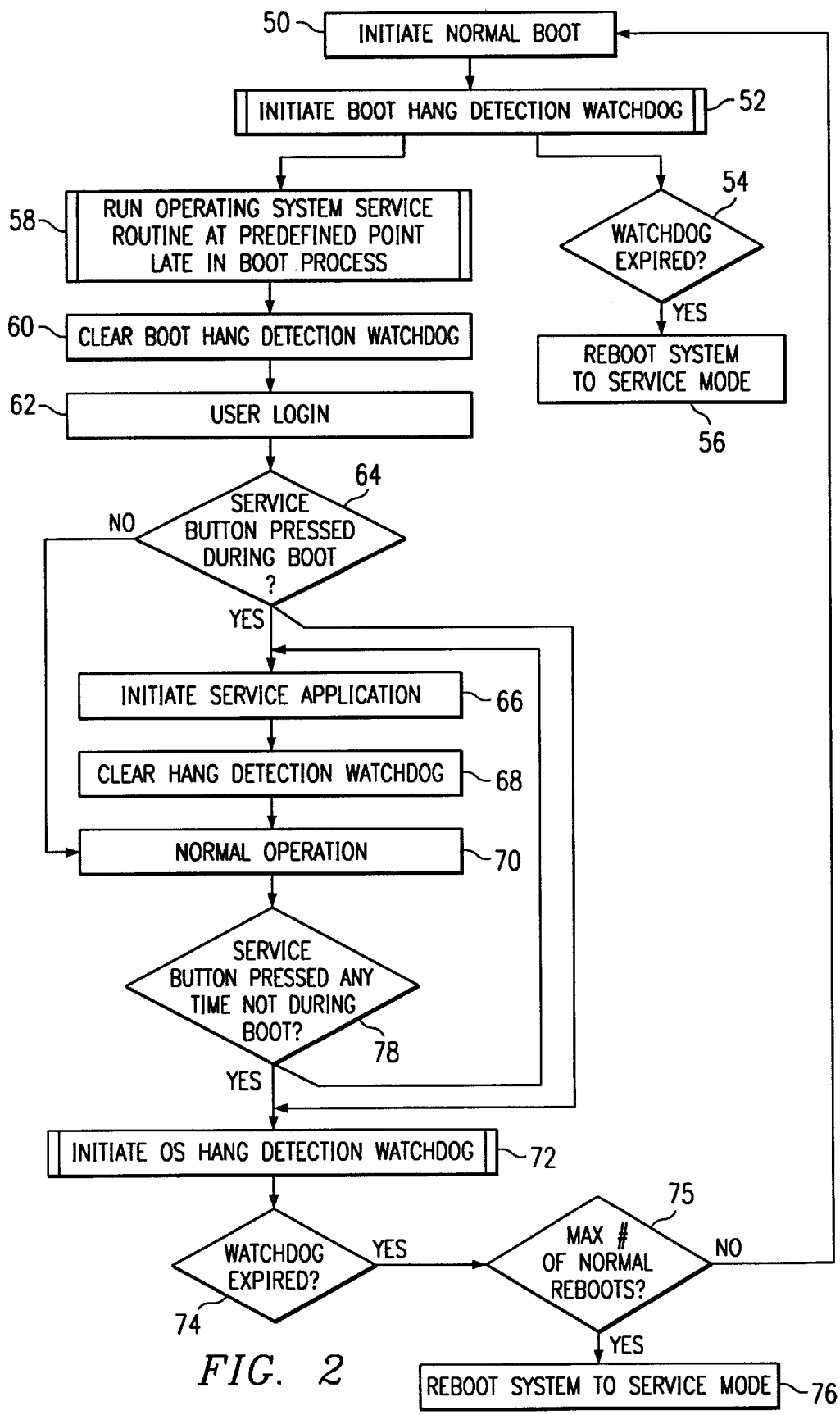
FIG. 2 depicts a flow diagram of operating system monitoring during and after a normal mode boot.

Referring now to FIG. 2, a flow diagram depicts steps for support automation for operating system monitoring of a normal boot mode. At step 50, a normal computer boot is initiated. For instance, the user of computer system 10 may apply power or may have instructed the operating system to reboot the system. At step 52 a hang detection watchdog timer is initiated. The booting of the operating system and the activity of the timer proceed in parallel within the system. The watchdog timer counts down. If it reaches zero before steps 58 and 60 are completed (i.e., when a service routine runs late in the boot process and clears the timer), then step 54 is achieved, and the system is rebooted into service mode in step 56.

Typically, the boot sequence tests hardware and initiates operating system boot within a predictable time period. Upon completion of the hardware testing, such as the POST test, and initiation of the operating system boot, an instruction is sent from an operating system service routine to clear the watchdog timer at step 58. If the watchdog timer is cleared at step 60, a normal boot is indicated. If the watchdog timer is not cleared and counts down to zero, the process proceeds to step 56 for rebooting into service mode with the service mode operating system. In one embodiment, additional normal boots may be automatically repeated before proceeding to the service mode boot sequence. In summary, if the watchdog timer remains uncleared after a predetermined period of time then it is known that the computer system did not boot through the point of the boot sequence at which the service routine clears the watchdog timer. Thus, the problem with the computer system may be identified to a certain degree based upon the boot sequence that was or was not completed.

Step 58 indicates that an operating system service routine is run at a predefined point in the latter part of the computer boot process. At step 60, the watchdog timer is cleared with the operating system service routine before expiration of the watchdog timer predetermined time period. If step 60 is reached, then the computer hardware and software tested and run up to initiation of the predefined point of the operating system boot sequence should generally be operational. Once this determination is made, at step 62 a user is provided an opportunity to login.

At step 64, a determination is made of whether the service button 26 was pressed during the OS boot process, as opposed to a normal boot in which the service button was not pressed. If the determination is no, the process proceeds to step 70 for initiation of normal computer system operation.

If at step 64 it is determined that pressing of the service button occurred during boot, then at step 66, a service application is initiated and at step 72 a hang detection timer is initiated for monitoring of an operating system hang-up. Hang detection monitoring uses hang detection timer 19 or another timer to test whether the operating system completes its service application launch within a predetermined period of time. The hang detection timer is initiated at step 72 and then cleared by an application running on the computer system after the application completes a predetermined portion of its loading and startup sequence at step 68. Thus, at step 68 a determination is made of whether the application loading and startup sequence is normal. If yes, the application running on the computer system clears the hang detection timer and the process proceeds to step 70 for initiation of support applications. If the hang detection timer remains uncleared for a predetermined period of time, then at step 74 a determination is made that the service application has failed to clear timer 19. This may indicate that the operating system has hung; at a minimum, it is incapable of starting the service application normally. At step 74, upon detection of expiration of the hang detection timer, the system is rebooted into normal mode (step 50) or service mode (step 76), dependent upon a definable number of unsuccessful attempts to reboot into normal mode (step 75).

If a user presses the service button while the computer is in normal operation, such as at step 70 of FIG. 2, or at anytime other than boot of the computer, then the system proceeds to step 78 to test the operating system for a hang-up. A service application is initiated at 66 and the hang detection timer is initiated at step 72. If the service application clears the timer at step 68, then the computer system proceeds to normal operation at step 70. If the timer expires at step 74, then an operating system hang-up is detected and the system attempts to reboot to normal mode (at step 75) until a specifiable number of normal reboot failures have occurred, at which point the system reboots to service mode at step 76. This allows a determination of operating system functionality without a need for a complete reboot. Further, if the timer expires at step 74, trouble shooting is possible with the service mode even though the normal operating system is not functional.

Figure 3:
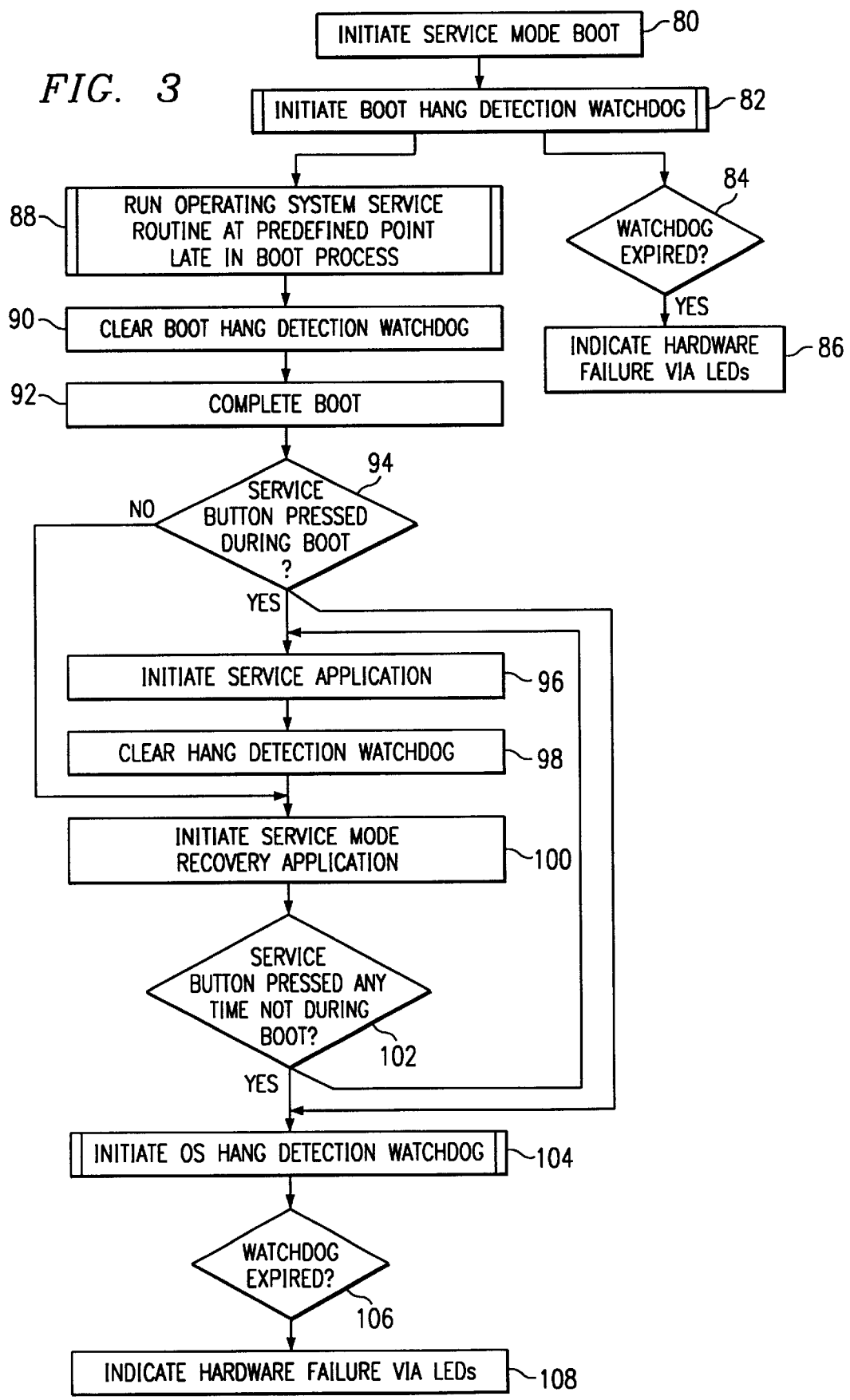
FIG. 3 depicts a flow diagram of operating system monitoring during and after a service mode boot.

Referring now to FIG. 3, service mode is initiated at step 80 with a service mode boot sequence. At step 82, a service mode watchdog timer is initiated. As above, this watchdog timer counts down toward zero in parallel with the loading of the (in this case, service mode) operating system. If the watchdog timer reaches zero (step 84) before it is cleared late in the service mode boot process (steps 88 and 90), then the service mode boot has failed and this is indicated by setting the LEDs to indicate hardware failure (step 86). A hardware problem is probable since neither the main operating system nor the service mode operating system were able to bring the computer to an operational state.

At step 88, a service mode operating system routine is run at a predefined point in the later part of the boot process. If the service routine runs at step 88, then at step 90 the routine clears the timer to indicate that the service mode operating system is functional. At step 92, computer system boot is completed with the service mode operating system.

At step 94, a determination is made of whether the service button was pressed during the normal mode or service mode boot. The state of button pressed during boot is stored across reboot attempts that fail. If yes, then the service application is launched and a system hang detection test proceeds with initiation of the operating system hang detection timer at step 104. Again, the counting down of the hang detection timer occurs in parallel with the loading and startup of the service mode recovery application at step 96. If this succeeds, it will run code to clear the hang detection time at step 98. At this point, the service mode operating system is known to be at least functional enough to start the service mode application. At step 100, service support applications are initiated such as those useful for analyzing software problems. The computer system is operating in service mode and is available for troubleshooting.

At step 106, if the watchdog timer counts down to zero (i.e., expires) prior to being cleared by the service application, then at step 108 the service mode operating system has been shown to be incapable of loading and starting the service application within the preset time period. At this point, a hang of the service mode operating system has been detected, and the process ends with indication of a probable hardware problem on lights associated with the computer system at step 108.

At step 102, if the service button was pressed while the computer is in service mode operation, then the system proceeds to steps 104 and 96 in parallel to test the service mode operating system for a hang-up. A service application is initiated at step 96 and the hang detection timer is initiated at step 104 If the service application clears the timer at step 98, then the computer system proceeds to service mode operation at step 100 to allow initiation of service mode recovery applications that allow analysis of the computer system failure and corrective action. If the timer expires at step 106, then an operating system hang-up is detected and the system indicates a probable hardware failure at step 108. This allows a determination of service mode operating system functionality without a need for a complete reboot.

The following case examples will further clarify the operation of the monitoring system. If the monitoring system finds no hardware or operating system faults, then the computer user may seek a resolution of the problem or question through local help on the computer system or by connecting with help over the internet using the computer system. Local and remote internet-based help will resolve the majority of computer problems or questions.

Another helpful case example is a non-fatal hardware failure, such as a CD-ROM or audio speaker card failure. The monitoring system should indicate that no failure has occurred with the operating system, and the user may contact technical support to have new hardware sent. Some types of non-fatal hardware failures will limit the options available for obtaining help. For instance, the computer system will operate without a modem or network interface card ("NIC"). However, failure of this hardware will limit the computer system's ability to interact over the Internet to obtain help. In part, modem failure may be addressed by entering the service mode. For instance, if modem failure is associated with modem configuration or ISP dial instructions, then a service mode modem configuration may support an Internet-based problem solution.

In another case example, if the normal mode operating system is not operational, will not boot or is otherwise unstable, a modem connection may be established with the service mode operating system. The Internet connection through the service mode allows direct system analysis of the operating system to automatically support operating system problem resolution and operating system restoration. For instance, a new operating system or relevant parts of the operating system may be loaded over the Internet to replace the faulty operating system. If the automatic problem resolution fails to resolve the problem, then the user may call technical support and identify the problem based on the displayed light configuration.

As one additional case example, the computer system may have a fatal flaw that prevents operation in both the normal and the service modes. For instance, the computer system may be set up incorrectly or may have a fatal hardware fault, such as a motherboard, hard drive or power supply fault. In such instances, an explanatory chart provided with the computer system will provide the problem associated with display light configurations, and simple instructions for the user to follow. The user may then use this information to contact technical support and obtain replacement hardware.

The problem identification and resolution system described herein may be provided as a build-to-order component of the computer system. For instance, less sophisticated users may order their computer system with single-button push problem resolution, whereas more experienced users may order computer systems with standard configurations. Alternatively, computer system buyer's may order only portions of the system, such as a timer associated with just main operating system monitoring that does not include the ability to automatically call up a service mode operating system.

Although the present invention has been described in detail, it should be understood that various changes, substitutions and alterations can be made hereto without departing from the spirit and scope of the invention as defined by the appended claims.

What is claimed is:

1. A method for monitoring a computer system boot, the method comprising:

initiating a computer system boot, including initiating a BIOS and a first operating system;

initiating a timer;

clearing the timer if a predetermined point of the computer system boot sequence occurs;

determining that a computer system failure exists if the timer remains uncleared after a predetermined time period using a monitoring state machine associated with the BIOS;

initiating a service mode operating system operable to identify the computer system failure;

said determining step further comprises identifying one or more computer system problems associated with the predetermined point of the computer system boot sequence; and said predetermined point of the boot sequence comprises initiation of the first operating system boot, the computer system problem comprising a hardware fault.

2. A method for testing for failure of a computer system, comprising:

initiating a computer system boot with a BIOS and a first operating system;

initiating a timer;

clearing the timer with an application run by the first operating system;

determining a computer system failure has occurred if the timer remains uncleared after a predetermined time period;

initiating a re-boot using a service mode operating system if a computer system failure is determined, the service mode operating system operable to identify the computer system failure;

initiating a second timer;

clearing the second timer with an application run by the computer system upon substantial completion of the re-boot with the service mode operating system; and determining a service mode operating system failure if the timer remains uncleared after a predetermined time period.

3. The method of claim 2 wherein the computer system failure comprises a failure of the first operating system and wherein the timer is cleared by a service application associated with the first operating system.

4. The method of claim 2 wherein the service mode operating system comprises Windows Safe mode.

5. A computer system comprising:

a processor having at least one timer;

a BIOS for booting the computer system;

a first operating system for supporting computer system operations;

a monitoring state machine associated with the BIOS and in communication with the processor, the monitoring state machine operable to detect operating system failure by comparing elapsed time for an operating system function associated with the first operating system against a predetermined time period, the elapsed time measured with the timer; and the monitoring state machine operable to initiate a service mode operating system, the service mode operating system operable to identify the detected operating system failure.

6. The system of claim 5 wherein the operating system function comprises calling an application upon substantial completion of a computer system boot.

7. The system of claim 5 wherein the monitoring state machine initiates timing with the timer upon user login to the computer system.

8. The system of claim 5 wherein the operating system function comprises calling a service routine during computer system boot.

9. The system of claim 8 wherein the monitoring state machine initiates timing with the timer upon the application of power to the computer system.

10. The system of claim 5 further comprising service lights in communication with the BIOS, the service lights for indicating identification of problems detected on the computer system.

11. The system of claim 5 further comprising a service button for interrupting the processor and initiating the timer.

* * * * *